May 5, 1931.  R. BRICARD  1,804,310

IRREVERSIBLE ROTARY POWER TRANSMISSION SYSTEM

Filed Jan. 22, 1929

Inventor:
R. Bricard,
By Laupner, Parry, and Laupner
Att'ys.

Patented May 5, 1931

1,804,310

UNITED STATES PATENT OFFICE

ROGER BRICARD, OF PARIS, FRANCE, ASSIGNOR TO SOCIÉTÉ ANONYME FRANÇAISE DITE: BRICARD, ANCIENNE MAISON STERLIN, OF PARIS, FRANCE

IRREVERSIBLE ROTARY POWER TRANSMISSION SYSTEM

Application filed January 22, 1929, Serial No. 334,309, and in France October 31, 1928.

This invention relates to irreversible rotary power transmission systems and consists in an improvement in or modification of the system claimed in the copending application of Raymond Petit, Serial #246,597, of Jan. 13, 1928, the chief object being to provide an improved partial or total declutching device for depriving the secondary element of the drive either wholly or partly of its irreversible character.

This result is obtained according to the present invention by providing a bearing annulus within the fixed casing which encloses the transmission mechanism and against the inner wall of which annulus the locking segments of the device may press tightly or not, the object of the present invention being to have this annulus of variable diameter so that while normally it is small enough to be within the range of engagement of the locking mechanism, its diameter may be expanded to such an extent that the locking mechanism is incapable of engaging it, and consequently the irreversible function cannot materialize.

Figure 1:
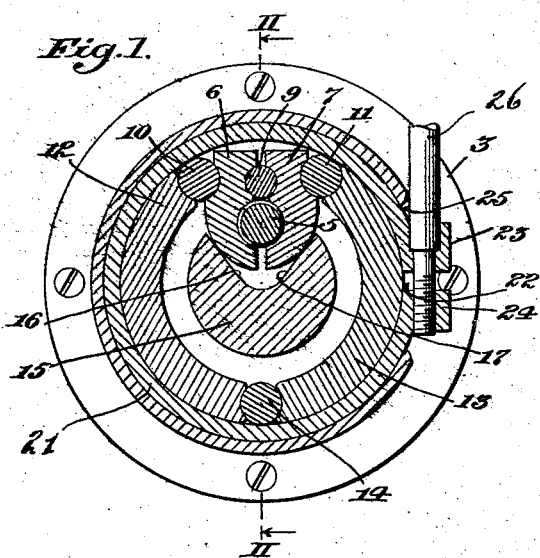
Figure 2:
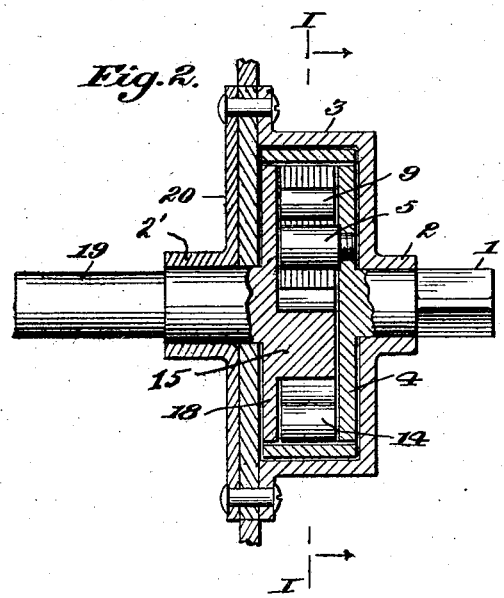

In accompanying drawings Figure 1 is a section of irreversible mechanism embodying the improvement of my invention, the section being taken along the line I—I of Figure 2, while Figure 2 is a section in a plane parallel to the axis taken along the line II—II of Figure 1.

As will be seen from the drawings, which shows diagrammatically an irreversible device (analogous to that described in the specification of the main application for patent) a casing composed of parts 3 and 20 is provided, preferably attached in any permanent manner to a stationary part of the device with which the irreversible mechanism is associated and forming a bearing 2 in which the driving shaft 1 and a similar bearing 2' in which the driven shaft 19 are journaled respectively. The driving shaft is fixed to a plate 4, said plate carrying a trunnion 5, see particularly Figure 1, this trunnion being the only element fixed to the driving shaft which appears in Figure 1.

The driven shaft 19 is connected fixedly to a plate 18 which has a projecting boss 15 lying in the same zone as the trunnion 5. The boss 15 is the only element fixed to the driven shaft shown in Figure 1, so that for purpose of convenience when considering Figure 1, the trunnion 5 may be considered the driving shaft while the boss 15 may be regarded as the driven shaft. A combination of loose members is arranged between the driving and driven elements within the casing 3 said elements consisting of clutch shoes 12 and 13 of arcuate contour which in the aforementioned application are adapted to grip the inner cylindrical wall of the casing 3 but which, by virtue of the improvement constituting the present invention are adapted to engage with the inner cylindrical bearing surface of an expansible annulus 21 itself arranged within the casing 3 and non-rotatable with respect thereto. The expansible annulus is split at one side as indicated at 22 and provided with end lugs 23 and 24 projecting through a suitable slot 25 in the casing 3. Said lugs are engaged by the operating key 26 by means of which the annulus 21 may be expanded or reduced in diameter.

The clutch shoes 12 and 13 are symmetrically arranged within the annulus having one end of each abutting against a free trunnion 14 and their other ends separated far enough to admit a toggle construction consisting of two free levers 6 and 7 and three free trunnions 9, 10 and 11, the trunnions 10 and 11 being interposed between the spaced ends of the clutch shoes and said levers, while the trunnion 9 is between said levers and forms a shifting fulcrum therefor. It will be observed that the axes of the free trunnions 9, 10 and 11 are in triangular arrangement, the axis of the trunnion 9 being the apex of the triangle and that when the trunnion 9 moves radially outward this apex approaches the base of the triangle forcing the levers 7 and 9 apart at the outer ends and causing the binding of the clutch shoes against the bearing surface of the annulus 21.

The opposite ends of the levers have cooperating recesses which fit loosely around the trunnion 5 while said outer ends to themselves extend into a recess formed in the boss 15.

Now, supposing that the driving shaft be rotated, this shifts the trunnion 5 in either direction according to that in which the driving shaft is turned, the trunnion 5 contacting with the inner end of either of the levers 6 or 7, as the case may be, rocking said lever about one of the trunnions 10 or 11, as the case may be, thus pushing the free trunnion 9 radially inward, loosening the toggle joint formed by the trunnions 9, 10 and 11 so that the clutch shoes do not bind against the bearing surface of the annulus. This permits the driving shaft, represented by the trunnion 5 to rotate bodily within the annulus with all of the loose mechanism and carrying with it the driven shaft, represented by the boss 15, through the engagement of either of the levers 6 or 7 with the side walls 16 or 17, as the case may be, of the recess in said boss.

When the driven shaft 19 attempts to rotate, the boss 15 is rocked in one or the other direction, the walls 16 or 17 pushing against the inner ends of the levers 6 or 7 and rocking them so as to force the free trunnion 9 radially outward, thus performing the toggle action which drives the trunnions 10 and 11 apart and brings the clutch shoes 12 and 13 into binding relation with the annulus. Since the system of loose elements is inhibited from rotation by the binding of the clutch shoes, the attempted rotary motion of the driven shaft cannot be communicated through the levers 6 or 7 to the trunnion 5 of the driving shaft.

From the above description it is to be understood that the reversible function of the apparatus depends for is realization upon the ability of the clutch shoes to bind against the annulus and the present invention accomplishes its purpose of rendering the irreversible function inoperable at will by enlarging the diameter of the annulus to such an extent as to put its bearing surface out of reach of the clutch shoes even when the toggle represented by the trunnions 9, 10 and 11 is spread to its utmost extent.

It is evident that the expansible annulus also provides means for taking up lost motion or play in the irreversible mechanism without necessarily inhibiting the exercise of the irreversing function.

It will also be understood that the invention does not apply exclusively to irreversible rotary transmission devices which comprise rigid segments, but it may also apply to any other device giving the same result, it being possible to obtain the regulation and the extent of the reactions of the secondary on the primary in these apparatus by inserting, between the fixed casing and the locking elements, an extensible collar, analogous to that which has just been described.

What I claim is:

Irreversible bi-directional transmission mechanism including a fixed clutch element comprising an expansible annulus of variable diameter, free clutch shoes adapted to bind against said annulus in the irreversing function of said mechanism, means forming a free toggle joint interposed between said clutch shoes for actuating the same and free levers for operating said toggle joint, a driving and a driven shaft, said free elements being rotatable as a body with said driving and driven shafts when said toggle joint is in loose position, means connected to said driving and driven shafts respectively acting upon opposite sides of said lever, and means for expanding said annulus to a diameter beyond the reach of said clutch shoes for inhibiting the irreversing function of said mechanism.

In testimony whereof I have signed this specification.

ROGER BRICARD.